Patented May 15, 1934

1,958,898

UNITED STATES PATENT OFFICE 1,958,898

PROCESS OF CONCENTRATING DILUTE ALIPHATIC ACIDS

George P. Lunt, Brookline, Mass., assignor to E. B. Badger & Sons Company, Boston, Mass., a corporation of Massachusetts No Drawing. Application June 21, 1933, Serial No. 676,925

17 Claims. (Cl. 260—122)

This invention relates to improvements in the production of concentrated lower aliphatic acids, such, for example, as acetic acid and other lower fatty acids, from their weak or dilute solutions, whatever may be the process in which they occur.

This application is a continuation in part of my copending application, Serial No. 519,685, filed March 2, 1931.

The object of the invention is to provide an efficient commercial process of concentration through the employment of solvents which have less fire hazard, that may be condensed with ordinary cooling water on account of the higher boiling points, which allows the re-use of the solvent over long periods of time without replacement, and are capable of producing directly a concentrated acid substantially 100% in strength, and which, for the concentration of a given amount of dilute acid, may be of relatively less bulk or volume than heretofore required, with a low loss in handling and a consequent gain in the amount of solution which may be concentrated in a given apparatus and with a reduction in the cost of concentration.

Several processes have been proposed or employed for the concentration of aliphatic acids such as acetic acid from dilute water solutions, the more important of which are briefly enumerated below.

1. The use of a single solvent having a lower boiling point than the acid, such as ethyl ether, ethyl acetate, etc., for the extraction of the acid from the dilute solution and the subsequent concentration of the extracted acid by rectification.

2. The extraction of the acid from weak solutions by solvents having a higher boiling point than that of the extracted acid, such as butyl acetate, amyl acetate, etc., with the subsequent separation of the extracted acid from the solvent by fractional distillation, accomplishing the separation only by the introduction of a lower boiling solvent such as ethyl acetate or by a lower boiling hydrocarbon, using the principle of azeotropic mixtures for the separation.

3. The use of higher boiling solvent such as cresol where the weak acid solution is vaporized and the vapors scrubbed with the solvent, absorbing the acid in the solvent and allowing the water to pass off in the form of steam, substantially free of acid, with subsequent removal of the absorbed acid by fractional distillation usually under a vacuum.

4. The extraction of the acid with a solvent of lower boiling point than the acid, mixed with a hydrocarbon of lower boiling point than the acid in order to obtain a higher concentration of the extracted acid due to the insolubility of the water in the hydrocarbon, and the subsequent concentration of the acid by fractional distillation.

When a single solvent of lower boiling point than the acid is used, either a very substantial amount of water is extracted at the same time, leaving an acid of a concentration much less than 100% after removing the solvent, or a very large amount of solvent is required to completely extract the acid.

When a solvent of higher boiling point than the acid is used, difficulties are likely to be and have been encountered in separating the solvent and acid completely, causing a loss in acid or a recovered product of impure quality. If any residual impurities are encountered in the extraction, these materials separate out as the acid is extracted, leaving such residual impurities in the solvent and requiring further treatment, which usually results in a loss of solvent or gradually impairs the solvent as an extracting medium.

When a solvent of higher boiling point than the acid is used for absorbing the acid from the vaporized weak acid, all water must be vaporized as well as the acid, and when such solvents as cresol are used, a vacuum distillation, from the practical standpoint, is employed in order to separate the acid from the solvent, thus requiring expensive equipment.

When employing a solvent of lower boiling point than the acid mixed with a hydrocarbon of lower boiling point than the acid, a much higher strength acid is recovered when separating the solvent after extraction than with a relatively efficient single, lower-boiling-point solvent, but the aliphatic acids are relatively insoluble in hydrocarbons and therefore a much larger volume or bulk of solvent must be used to extract the acid completely from the weak solution than when employing a good single solvent like ethyl ether, thereby increasing the cost of operation, loss in handling and the size of the equipment required.

In expressing the value of solvents for extracting aliphatic acids, it is customary to state the value of the solvents in terms of their partition coefficients which, in this case, is the ratio of the strength of the acid in the solvent to the strength of the acid in the water when the solutions are in equilibrium.

The value of a solvent is also determined by the strength of acid at which the solvent, acid and water become completely miscible. In some cases a solvent which has a high partition coefficient for varying strengths of acid becomes completely miscible at comparatively low strengths of acid and is therefore not useful in many commercial applications, since the process can only be employed when the solvent and acid solutions separate.

Ethyl acetate, which has a boiling point of approximately 77° to 78° centigrade, has a higher partition coefficient in respect to both weak and strong solutions of acetic acid than either ethyl ether or isopropyl ether. Its use as a commercial solvent, however, is objectionable in that with the acid it dissolves a substantial amount of water from the solution and also because it is completely miscible with acid solutions of approximately 20% or more which fall well within the range of commercial applications.

Isopropyl ether in which water is substantially insoluble and which reaches complete miscibility only with strong solutions of acetic acid beyond the range of those reached in ordinary commercial applications is also commercially inefficient as a solvent. While it has a reasonably high partition coefficient with respect to strong solutions of acetic acid, it has a very low partition coefficient with respect to weak solutions thereof.

Isopropyl ether has a boiling point of from 67° to 68° centigrade and is substantially insoluble in water and water substantially insoluble in it. Acetic acid, however, in a relatively strong solution, such as 25% acid, is relatively soluble in isopropyl ether in contact with said 25% solution but much less soluble therein when occurring in relatively weak solutions, such as .5% to 3%.

I have found, however, that a very efficient solvent may be had by combining in the extracting medium two solvents both of lower boiling point than the acetic acid, one of which, such as isopropyl ether, has a relatively low partition coefficient with respect to weak solutions of the acid but a reasonably high partition coefficient with respect to stronger solutions and providing a solvent in which water is substantially insoluble and with complete miscibility only with relatively strong solutions of the acid, and the other of which, such as ethyl acetate or the like, has a high partition coefficient in respect to both weak and strong solutions, even though the latter when used alone dissolves a substantial amount of water from the acid solution. Through the use of such an extracting medium there may be secured directly after removal of the solvent an acetic acid of high concentration, for example, from 99% to substantially 100%, while at the same time there is required for the extraction of the acid an aggregate volume of the combined solvents which is much less than the aggregate volume of the solvent and hydrocarbon above referred to when using proportions of the latter solvents which will give a similar concentration of acetic acid after the removal of the solvent. In forming this extracting medium I therefore add to isopropyl ether a complementary solvent having the differing partition coefficient previously referred to and which, by way of illustration, may be ethyl acetate.

The isopropyl ether solvent has a high selectivity in that it dissolves or extracts substantially no water from the aqueous solution of acid, but its solvent power is less than that desirable in that it does not extract sufficient acid, particularly in the case of weak solutions of acid. On the other hand, the ethyl acetate, and like solvents, possess a high solvent power but are insufficiently selective. These two types of solvents are miscible in each other and when combined together, as a mixed-solvent, result in a solvent blend characterized by both a high solvent power and high selectivity. This results from the fact that the ethyl acetate, or the like, readily extracts the acid from the aqueous solution but is prevented from carrying large amounts of water into the extract phase due to the presence of the isopropyl ether. In addition, the isopropyl ether contributes its own solvent power for the acid, which is reasonably high with respect to strong solutions.

Preferably the complementary solvent used with the isopropyl ether should have a higher solvent power than the latter both with respect to weak and strong acid solutions, in order to obtain the most efficient results, but it will be evident that improved results will be obtained even though the complementary solvent has a higher solvent power only with respect to weak solutions.

My process therefore makes it possible to utilize solvents of the ethyl acetate type, in order to obtain the benefit of their high solvent power, despite the fact that such solvents dissolve substantial amounts of water when used alone. The use of isopropyl ether results in greater efficiency than the use of a hydrocarbon because of its greater solvent power than the latter.

The proportions of the two solvents employed in forming the extracting medium may be varied within considerable limits while still availing of the advantages and principles of this process. It will be obvious that no definite limits in respect to proportions may be laid down, but experience has shown that the most efficient results are had when the extracting medium consists of a greater proportion by volume of isopropyl ether than ethyl acetate, such, for example, as 60% to 80% of isopropyl ether and 40% to 20% of ethyl acetate, with a preference for approximately 75% of the former and 25% of the latter.

While ethyl acetate meets the requirements as the complementary solvent, there may be employed in place of ethyl acetate other solvents having a lower boiling point than that of acetic acid, such, for example, as an aldehyde, ester or ether having a partition coefficient and solvent power relatively high with respect to both weak and strong solutions of the acid, specific instances of which are ethyl formate, methyl acetate, methyl propionate, butyric aldehyde, ethyl propionate, ethyl ether, isobutyl aldehyde, isopropyl acetate, isopropyl formate, propionic aldehyde and propyl formate.

With compounds of the described nature and proportions a combined solvent is produced having a joint or effective partition coefficient which is maintained at a relatively high point throughout the entire range of acid solution strength which must be encountered in the commercial extraction of the acid and which for the entire range is substantially higher than the effective partition coefficient of the solvent and hydrocarbon previously referred to.

The extraction of the acid by the use of the described extraction medium may be carried out in any well known manner and in any well known apparatus. This will ordinarily, though not necessarily, contemplate the introduction of an extraction medium into the acid solution, or vice versa, the thorough mixing of the two in a counter current manner, the separation by gravity of the aqueous residue from the concentrated acid solution in its extraction solvent, and the withdrawal of the latter to a distilling apparatus where by fractional distillation the extraction medium is separated, leaving the concentrated acid.

The constructional details and the utilization of apparatus qualified to perform such an extraction process are well known and require no specific description. As an illustration, however, and without in any wise limiting the invention thereto, the extracting medium of the character previously described may be introduced just above the lower end of a long, upright, extraction column, into the upper end of which there is introduced the dilute solution of acid which is required to be concentrated. The process is carried out at normal temperatures and the two solvents comprising the extracting medium may be introduced into the column in liquid form either separately or together. The dilute acid solution, being of greater specific gravity than that of the extracting medium, tends to descend, while the latter tends to rise, producing counter currents which effect a mixture of the two substances. The concentrated acid with its extracting solvent which ascends to the top of the column is then withdrawn therefrom, while the aqueous residue which descends to the bottom of the column is withdrawn from the bottom.

The extract withdrawn from the upper part of the column is conducted to any usual type of fractional distilling apparatus, the strong acetic acid being withdrawn from the base of this apparatus and the vapors from the solvents comprised in the extracting medium being withdrawn from the top thereof, and, after condensation, being returned to the base of the extraction column and again introduced into the latter.

Initially the extraction column is charged with a quantity of the dilute acetic acid and the extracting medium then introduced. When the dilute solution withdrawn from the bottom of the column shows the acid to be so weak as to be valueless, the process is then operated as a continuous process.

It will be seen that the extraction takes place effectively in all parts of the column. In the upper part thereof, where the dilute solution is in relatively more concentrated form, extraction through the action of each of the two solvents is effected, whereas in the lower portion of the column, where the dilute solution is relatively less concentrated, and where it has lost much of its originial acid content, extraction by the action of the complementary solvent,—ethyl acetate,—predominates and is effective in removing substantially all the remaining acid. At the same time, the use of the isopropyl ether so minimizes the amount of water entering into the solution in the extracting medium that the acid finally secured through the distillation process is of high concentration, and, as stated, may be from 99% to substantially 100% acid.

I claim:

1. The process of concentrating aqueous solutions of lower aliphatic acids, which consists in extracting the acid with an extracting medium comprising from 60% to 80% by volume of isopropyl ether and from 40% to 20% by volume of ethyl acetate, and thereafter separating the acid from the extracting medium through distillation.

2. The process of concentrating aqueous solutions of lower aliphatic acids, which consists in extracting the acid with an extracting medium essentially comprising two solvents having a lower boiling point than that of the acid, one of which is isopropyl ether and the other ethyl acetate, and thereafter separating the acid from the extracting medium through distillation.

3. The process of concentrating aqueous solutions of lower aliphatic acids, which consists in extracting the acid with an extracting medium essentially comprising two solvents having a lower boiling point than that of the acid, one of which consists of isopropyl ether and the other of a solvent from a group consisting of ethyl acetate, ethyl formate, methyl acetate and methyl propionate, and thereafter separating the acid from the extracting medium by distillation.

4. The process of concentrating aqueous solutions of lower aliphatic acids, which consists in extracting the acid with an extracting medium essentially comprising two solvents having a lower boiling point than that of the acid, one of which consists of isopropyl ether and the other of a solvent from a group consisting of butyric aldehyde, ethyl formate, ethyl propionate, ethyl ether, isobutyl aldehyde, isopropyl acetate, isopropyl formate, methyl acetate, methyl propionate, propionic aldehyde, propyl formate, and thereafter separating the acid from the extracting medium through distillation.

5. The process of concentrating aqueous solutions of lower aliphatic acids, comprising extracting the acid with an extracting medium consisting essentially of isopropyl ether and of an aliphatic acid extracting agent having a lower boiling point than the acid and further characterized by being miscible with the isopropyl ether, by having a greater solvent power than the latter for the acid, and by dissolving substantial amounts of water if used alone for concentrating said aqueous solutions.

6. The process of concentrating aqueous solutions of lower aliphatic acids, comprising extracting the acid with an extracting medium consisting essentially of isopropyl ether and of an aliphatic acid extracting agent having a lower boiling point than the acid and further characterized by being miscible with the isopropyl ether, by having a greater solvent power than the latter for the acid with respect to both weak and strong solutions of acid, and by dissolving substantial amounts of water if used alone for concentrating said aqueous solutions.

7. The process of concentrating aqueous solutions of lower aliphatic acids, comprising extracting the acid with an extracting medium consisting essentially of isopropyl ether and a complementary solvent selected from the class consisting of the aldehydes, esters and ethers, the selected complementary solvent being characterized by having a lower boiling point than the acid, by being miscible with the isopropyl ether, by having a greater solvent power than the latter for the acid, and by dissolving substantial amounts of water if used alone for concentrating said aqueous solutions.

8. The process of concentrating aqueous solutions of lower fatty acids, comprising extracting the acid with an extracting medium consisting essentially of isopropyl ether and of a fatty acid extracting agent having a lower boiling point than the acid and further characterized by being miscible with the isopropyl ether, by having a greater solvent power than the latter for the acid, and by dissolving substantial amounts of water if used alone for concentrating said aqueous solutions.

9. The process of concentrating aqueous solutions of lower fatty acids, comprising extracting the acid with an extracting medium containing essentially 60–80 vol.% of isopropyl ether and 20–40 vol.% of a solvent having a lower boiling point than the acid and further characterized by being miscible with the isopropyl ether, by having a greater solvent power than the latter for the acid with respect to both weak and strong solutions of acid, and by dissolving substantial amounts of water if used alone for concentrating said aqueous solutions.

10. The process of concentrating aqueous solutions of lower fatty acids, comprising extracting the acid with an extracting medium consisting essentially of isopropyl ether and a complementary solvent selected from the class consisting of the aldehydes, esters and ethers, the selected complementary solvent being characterized by having a lower boiling point than the acid, by being miscible with the isopropyl ether, by having a greater solvent power than the latter for the acid, and by dissolving substantial amounts of water if used alone for concentrating said aqueous solutions.

11. The process of concentrating aqueous solutions of acetic acid, comprising extracting the acid with an extracting medium consisting essentially of isopropyl ether and of an acetic acid extracting agent having a lower boiling point than the acid and further characterized by being miscible with the isopropyl ether, by having a greater solvent power than the latter for the acid, and by dissolving substantial amounts of water if used alone for concentrating said aqueous solutions.

12. The process of concentrating aqueous solutions of acetic acid, comprising extracting the acid with an extracting medium consisting essentially of isopropyl ether and of an acetic acid extracting agent having a lower boiling point than the acid and further characterized by being miscible with the isopropyl ether, by having a greater solvent power than the latter for the acid with respect to both weak and strong solutions of acid, and by dissolving substantial amounts of water if used alone for concentrating said aqueous solutions.

13. The process of concentrating aqueous solutions of acetic acid, comprising extracting the acid with an extracting medium consisting essentially of isopropyl ether and a complementary solvent selected from the class consisting of the aldehydes, esters and ethers, the selected complementary solvent being characterized by having a lower boiling point than the acid, by being miscible with the isopropyl ether, by having a greater solvent power than the latter for the acid, and by dissolving substantial amounts of water if used alone for concentrating said aqueous solutions.

14. The process of concentrating aqueous solutions of acetic acid, which consists in extracting the acid with an extracting medium comprising from 60% to 80% by volume of isopropyl ether and from 40% to 20% by volume of ethyl acetate, and thereafter separating the acid from the extracting medium through distillation.

15. The process of concentrating aqueous solutions of acetic acid, which consists in extracting the acid with an extracting medium essentially comprising two solvents having a lower boiling point than that of the acid, one of which is isopropyl ether and the other ethyl acetate, and thereafter separating the acid from the extracting medium through distillation.

16. The process of concentrating aqueous solutions of acetic acid, which consists in extracting the acid with an extracting medium essentially comprising two solvents having a lower boiling point than that of the acid, one of which consists of isopropyl ether and the other of a solvent from a group consisting of ethyl acetate, ethyl formate, methyl acetate and methyl propionate, and thereafter separating the acid from the extracting medium by distillation.

17. The process of concentrating aqueous solutions of acetic acid, which consists in extracting the acid with an extracting medium essentially comprising two solvents having a lower boiling point than that of the acid, one of which consists of isopropyl ether and the other of a solvent from a group consisting of butyric aldehyde, ethyl formate, ethyl propionate, ethyl ether, isobutyl aldehyde, isopropyl acetate, isopropyl formate, methyl acetate, methyl propionate, propionic aldehyde, propyl formate, and thereafter separating the acid from the extracting medium through distillation.

GEORGE P. LUNT.